United States Patent Office 3,333,725
Patented Aug. 1, 1967

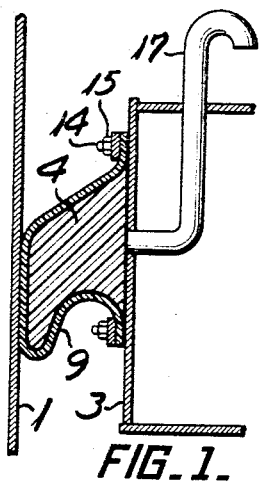
FIG.1.
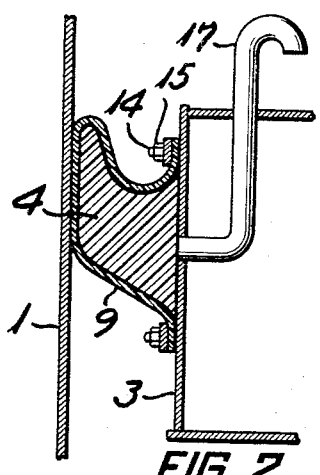
FIG.2.
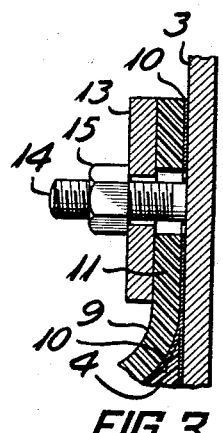
FIG.3.
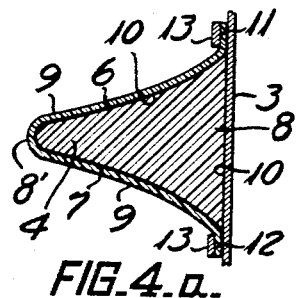
FIG.4.a.
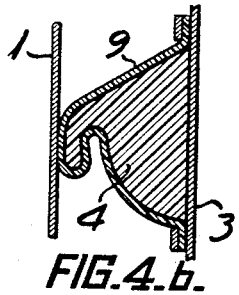
FIG.4.b.
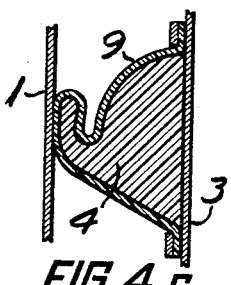
FIG.4.c.
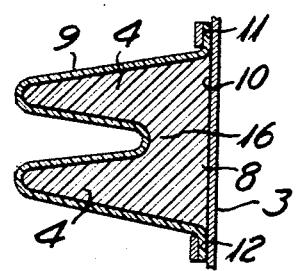
FIG.5.a.
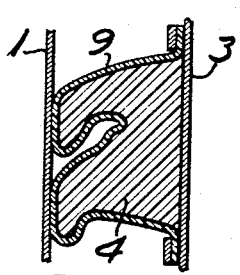
FIG.5.b.
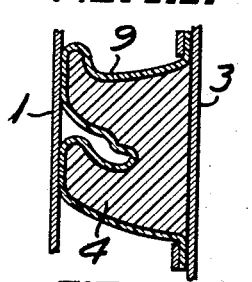
FIG.5.c.
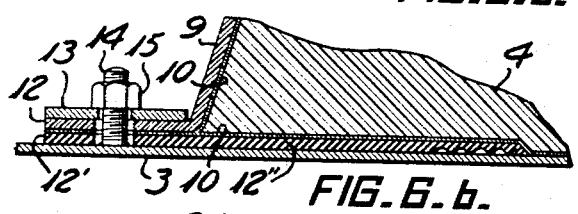
FIG.6.b.
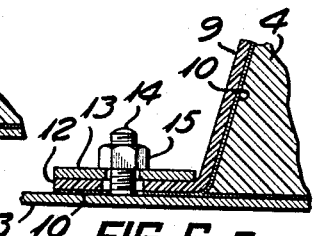
FIG.6.a.
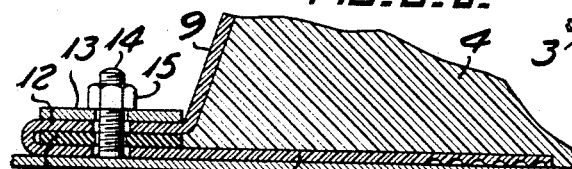
FIG.6.c.
INVENTORS
Hiroshi Hirata
Shigeru Tanaka
By Stevens, Davis, Miller & Mosher
ATTORNEYS

3,333,725
FLOATING COVER AND SEALING MEANS FOR LIQUID STORAGE TANK
Hiroshi Hirata, Meguro-ku, Tokyo, and Shigeru Tanaka, Totsuka-ku, Yokohama-shi, Japan, assignors to Chiyoda Kako Kensetsu Kabushiki Kaisha, Tokyo, Japan, a corporation of Japan
Filed Apr. 6, 1964, Ser. No. 357,380
Claims priority, application Japan, July 15, 1963, 38/36,056
2 Claims. (Cl. 220—26)

The present invention relates to storage tanks for petroleum products or other similar volatile liquids, more particularly to a floating roof or cover in combination with gas-tight sealing means for storage tanks having a cylindrical side wall. The floating cover located in the tank has attached around its periphery a sealing means of substantially constant width occupying the space between the inner wall of the storage tank and the periphery of the floating cover.

Although a compressible rubber or soft foamed plastics (referred to as "foam material" hereinafter) used as an inner core of a sealing means of this kind is known in various types, said foam material in said known sealing means does not operate satisfactorily and is very susceptible to damage and liable to lowering of its function, because it is adapted to function as a sealing means by causing it to bear against both the inside wall of the storage tank and the side plate of the floating cover utilizing resilience of said foam material which is shaped into a circular, rectangular, trapezoidal or oval cross-section and used as an inside core of said sealing means, and it does not satisfactorily overcome deformation due to shearing, tension and bending created additionally and inevitably by friction between said inner wall of the storage tank and the sealing means, but rather is a measure for forcibly suppressing those deformations.

Foam material possesses a property adequate for resilient material for compression and will function sufficiently when used as a compression material. However, no tensile, nor bending strength can be expected from the foam material.

Analysing further, a foam material may operate sometimes advantageously as a tensile resilient member showing a very large value of elongation for tension, but actually it is disadvantageous because it fractures easily in the surface because of its small tensile strength. In case of bending, a crease or wrinkle will be easily produced in the compression side and rapidly lower the bending strength, and elongation is large in the tension side with a small value of tensile strength due to its tensile characteristics and a fracture started from a slight scratch in the surface will occur very easily when it is bent over. Deformation of a foam material due to shearing will occur easily accompanied by a compression and its stress is considerably larger than that due to tension and bending as described hereinabove. If said deformation due to shearing is not remedied adequately an irregular deformation may occur in a sealing means, thus lowering its function considerably.

The same thing will occur when forcibly suppressing said deformation due to shearing. A sealing means, in which said inevitable deformation of the foam material is collectively and reasonably combined together, will properly combine the deformation due to bending, tension and shearing inherent and inevitable to friction between an inner wall of said tank and the sealing means, will restrict adverse effect attributable thereto to a minimum and will function as a reasonable and effective sealing means for a long period of time.

A basic object of the present invention is to enhance an advantageous function of the foam material as a compressive resilient member and to compensate its disadvantageous weak property as a bending or tensile member by a simple and reasonable manner and to use said material predominantly for bending, with tension and compression effectively combined, so as to suppress shearing stress to a minimum in a very natural manner thereby assuring the functioning of the sealing means for a long period of time.

Another object of the present invention is to shape core-forming foam material into a unique and desirable cross section and to cause said sealing material to exhibit a smooth bending deflection and to exert powerful bending resistance thereby assuring hermetic sealing in the manner of a sealing part.

Another object of the present invention is to protect the foam material forming a core portion of the sealing means according to the present invention in a unique and simple manner by means of a cover sheet which is flexible and possesses small elongation and large tensile strength and to improve the function of the sealing means by enhancing smooth bending deflection and increasing bending strength.

Still another object of the present invention is to increase the bending strength, enhance smooth bending deflection and stabilize a shape of the sealing means during its operation by fixedly mounting said sealing means on a circumferential side plate of the floating cover in a special and simple manner.

Still another object of the present invention is to maintain deformation of the sealing means caused by friction with the inner wall of the tank at a minimum thereby to stabilize the shape of said sealing means during operation of the floating cover by shaping the foam material into a core of unique cross section.

Still another object of the present invention is to provide a floating cover with sealing means wherein the sealing means necessarily exerts a strong reaction force to bring the floating cover back into an original concentric position in case the width of the sealing part becomes too small due to a deviation of said floating cover out of a normal concentric position by shaping a foam material into a core of unique cross section.

Further still another object of the present invention is to prevent any adverse effect caused by a variation of internal pressure within a cover sheet and make a core-forming foam material function more effectively by causing a sealing means according to the present invention to communicate with the outside atmosphere in a desirable manner.

Still another object of the present invention is to prevent penetration of liquid into the interior of said sealing means through a connected part between the sealing means according to the present invention immersed in said fluid and the peripheral side plate of the floating cover by means of a unique device.

Heretofore mentioned and other objects will be hereinafter realized by reference to the description of the preferable embodiments of a sealing means according to the present invention by way of examples with reference to the accompanying drawings, in which:

FIGS. 1 and 2 are sectional views showing an operation of a sealing means on the floating cover of one embodiment according to the present invention;

FIG. 3 is a sectional view showing a detailed construction of connected parts of the same sealing means on the side plate of the floating cover, in a larger scale;

Figure 7A:
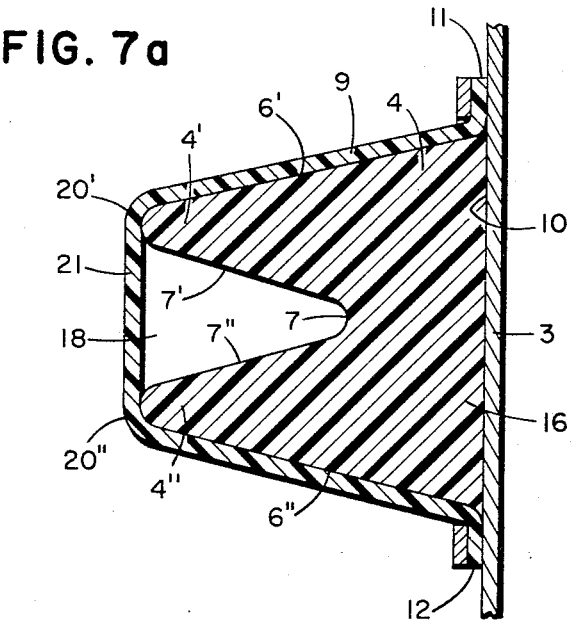
Figure 7B:
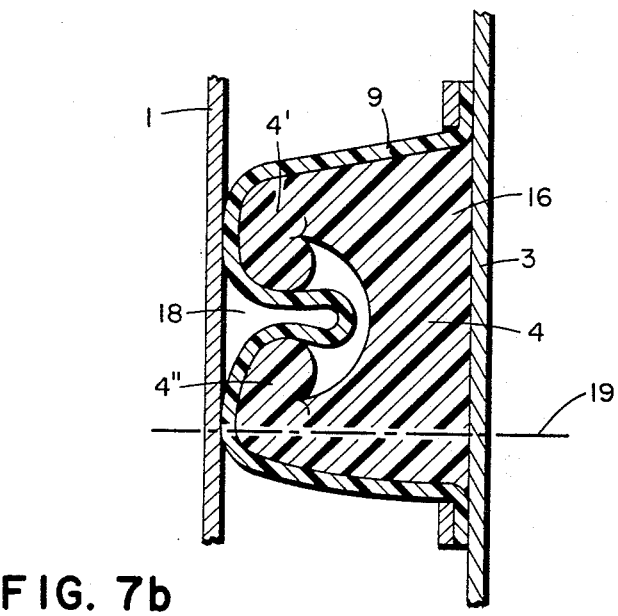

FIGS. 4a, b, c are sectional views showing free and deformed condition between the side plates of the floating cover and the inner wall of the tank, respectively, of a sealing means of one embodiment according to the present invention;

FIGS. 5a, b, c are sectional views showing conditions similar to FIG. 4 of another embodiment according to the present invention;

FIGS. 6a, b, c are sectional views showing different type of construction of connected parts of a sealing means on side plates of the floating cover respectively in case said sealing means are immersed in a fluid;

FIGS. 7a and 7b are sectional views showing normal and deformed views respectively of a sealing means similar to that of FIG. 5 but with the impervious cover sheet extending across the tips of the triangularly shaped core portions to either side of the groove instead of following the opposing sides thereof within the groove.

As illustrated in FIG. 4a, a sealing means is provided with a chevron-like cross section shaped out of said core-forming foam material and a top end of said chevron-like sealing means is made narrower than the base and curvilinear smoothly, for instance, semi-circular. If a base edge is fixedly mounted on a side plate of the floating cover, the sealing means will become a cantilever and have a shape and function similar to lamellar leaf springs. A bending moment will be distributed over a length of the cantilever forming a triangle having a vertex at the free end of said cantilever and a base at the fixed part (the bottom of foam material) thereof, thus providing a so-called "triangular bending moment diagram" which is one of the characteristics of a cantilever subject to a bending deflection by means of an external force applied on a free end (a top edge of said foam material). A core is provided with a cross section configuration corresponding to said bending moment diagram in its free condition as illustrated in FIG. 4a. Accordingly, moment of inertia of the cross section of said foam material is also distributed approximately corresponding to said bending moment. On the other hand, susceptibility to bending (angle of bending) is proportional to a ratio of the bending moment to the moment of inertia of the cross section and proportional to a distance from the fixed portion. As described hereinabove, a ratio of the bending moment to the moment of inertia of the cross section is approximately constant at each section of the present foam material. Therefore, susceptibility to bending is approximately proportional to a distance from the fixed portion, that is, a breadth of the sealed part. The top edge is easy and the bottom edge is hard to bend. This is a function similar to that of the lamellar leaf springs, which function is ideal as a resilient material subjected to a bending and constitutes an important feature of the core-forming foam material of the sealing means.

A smooth curvilinear surface on top of said foam material will then induce a bending of said top portion easily as it comes in contact with an inner wall of the tank thereby assuring an easier bending of the whole sealing means.

As described hereinabove, a reasonable bending of the sealing means will not involve any crease or wrinkle of the foam material, which is a disadvantage of the same material, in a relatively wide range of bending.

It is clearly expected that said foam material will function substantially equivalent to said lamellar leaf springs in connection with bending resistance. A strong bending resistance of the foam material in the base portion will cause said sealing means to adhere steadily onto the inner wall of said tank.

A function of the foam material similar to said lamellar leaf springs will cause the bending resistance of the sealing means to increase as the breadth of the sealed part becomes reduced due to eccentricity of the floating cover thereby assuring a righting force to bring said floating cover back into its original concentric position. And further, a compressive force will be applied on a bottom edge of the foam material when the breadth of the sealed part becomes reduced, thus restricting an eccentricity of said floating cover and increasing a righting force to bring it back into a concentric position by means of said powerful compressive force.

If a foam material of chevron cross section as illustrated in FIG. 4a is shaped initially with its top portion bent over upwardly in its free condition, it is possible to make said sealing means flex more likely upwardly than downwardly and this tendency will become more steady in proportion to the degree of initial bending. Accordingly, it is possible to prevent said foam material from swinging upwardly and downwardly due to friction between a top portion of said foam material and the inner wall of said tank in case the floating cover moves upwardly and downwardly thereby assuring a constant configuration of the cross section having a steady and constant orientation in any condition. Accordingly, a sealing means according to the present invention can be adapted to maintain a constant position with reference to the surface of liquid in said tank, thereby functioning more effectively. It should be understood that a sealing means can be provided with similar characteristics conversely, if it is initially shaped with its top portion bent over downwardly.

When said foam material forming a core is wrapped up with a cover sheet, which has a small value of elongation and a large value of tensile strength and is flexible and impervious to oil, liquid and gaseous substances, all around its outer surface (top and both sides of a chevron) except a bottom portion (where connected to a side wall of the floating cover) and then said sheet cover is adhered thereon by means of an oil impervious adhesive, elongation of said core-forming foam material will be restricted in its surface, tensile strength thereof will be increased, and fracture in the surface and wrinkles in the compression side both of which are inherent in said foam material will be completely prevented, thus further improving flexing characteristics of said core-forming foam material considerably. A feature of any cover sheet completely free from wrinkles is that it greatly improves the function of said sealing means which is subject to bending predominantly. The more rigid said cover sheet, the more improved is said feature. Also, if a sealing means is fixedly secured on a side plate of the floating cover through said cover sheet as illustrated in FIG. 3, said foam material will be prevented from coming off said side plate of the floating cover during operation of the latter thus assuring a steady mounting of said sealing means on said side plates of the floating cover and hence a steady functioning of said sealing means for a long period of time. It is understood that said cover sheet also provides other advantages, such as protection of the sealing means from damages caused by external source and prevention of degeneration by aging of the core-forming foam material.

With reference to FIG. 4, a sealing means according to the present invention comprises a core 4 of foam material, the cross section of which is shaped substantially into a chevron or an equilateral triangle having two straight or slightly curved sides 6, 7 and a smooth curvilinear vertex 8' and a flexible and oil impervious cover sheet 9 which is adapted to wrap up said chevron-shaped core 4 all around or except its base 8 and adhered onto said sides 6, 7 and said curvilinear vertex 8' by means of oil impervious adhesive, upper and lower selvage or extended edge portion 11, 12 of said cover sheet and said base 8 of the core 4 being adhered onto a side plate 3 of the floating cover by means of oil impervious adhesive 10 and both selvages 11, 12 of said cover sheet 9 being fixedly secured on said side plates of the floating cover by means of bolts 14 and nuts 15 laying a retaining bar 13 thereby assuring a perfect gastight fit at the connection.

As described earlier, the sealing means will become a kind of cantilever and act similarly to the lamellar leaf springs, and its cross section will vary over its length substantially corresponding to a bending moment distribution curve of a cantilever subjected to bending by an external force applied on its outer end. A chevron-like cross section of the sealing means is also designed to reasonably flex and resist bending. If desired, a fabric may be incorporated into said cover sheet 9.

A core 4 of chevron-like cross section may be disposed in two or more rows in parallel with each other and a base of each chevron may be united together into a single common base 16. Then, those cores 4 will be wrapped up with an oil impervious cover sheet all around or except said base 16 opposite to said side plate 3 of the floating cover and said cover sheet 9 will be adhered to said core 4 all around (as shown in FIG. 5a) or partially, leaving out two opposite sides of the adjoining chevrons forming the groove (as shown in FIG. 7a). A base portion 16 of said core 4 and upper and lower selvage 11, 12 of said oil impervious flexible cover sheet 9 will be adhered onto a side plate 3 of the floating cover by means of an oil impervious adhesive 10 in a gas-tight manner thereby increasing the contact area of said sealing means on an inner wall of the tank and improving efficiency of the gastight sealing.

A core 4 of chevron-shaped cross section which is wrapped up with a cover sheet 9 as described hereinabove may be provided with an initial inclination by making either one of those two sides 6, 7 longer than the other in order to prevent frequent change of direction of flexing of said core 4 at the free end due to friction caused by up and down motion of the floating cover side plate 3, for instance a core 4 will be formed with an initial inclination rising up toward the free end thereof by making a lower side 7 longer than the other 6. An angle of upward flexure from the initial inclination will be smaller than that of downward flexure from the same inclination thereby facilitating upward flexure. If said initial inclination of a sealing means is adequately chosen, said sealing means will be steadily maintained in contact with an inner wall 1 of the tank without changing of direction of flexure caused by a friction between sealing means and an inner wall of the tank 1. Accordingly, bending strength will not be reduced and the configuration of the cross section is steadily maintained. Also, said sealing means will be maintained in a constant position with reference to the liquid surface stored in the tank, thus further stabilizing the function thereof.

A core 4 of any cross section wrapped up with said cover sheet 9 may be communicated with the atmosphere through a vent 17 as illustrated in FIGS. 1 and 2 in order to prevent an irregular change of pressure of sealed air within said cover sheet 9 and thereby permit said core 4 to function perfectly.

A lever part of said sealing means may be immersed into a liquid in order to reduce the free surface of said liquid. This is one of the important functions of a sealing means for the purpose of preventing evaporation of the liquid. A liquid tight construction designed for preventing liquid from penetrating into the sealing means is illustrated in FIGS. 6a, b, c.

A liquid-tight construction for preventing liquid penetration into the core 4 through its connection on said side plate 3 of the floating cover is shown in three different embodiments illustrated in FIGS. 6a, b, c respectively. With reference to FIG. 6a, a lower selvage 12 of said cover sheet 9 is adhered onto a side plate 3 of the floating cover by means of oil impervious adhesive 10 and further pressed against and fixed on said side plate 3 by bolts 14 and nuts 15 laying a retaining bar 13 to prevent liquid from penetrating through said connection. With reference to FIG. 6b, a packing 12' of oil impervious soft rubber is inserted between a lower selvage 12 of the cover sheet 9 and said side plate 9 of the floating cover all around the peripheral surface of said side plate and upper part 12" of said packing 12' is extended above the free surface of liquid and provided with corrugations in a surface opposite to said side plate of the floating cover in order to provide air gaps for stopping an unusual rise of liquid due to a capillary reaction. Said cover sheet 9 and packing 12' are pressed against and fixed on said side plates 3 of the floating cover in the lower tightened part thereof. Liquid penetration between a cover sheet 9 and a packing 12' and through bolt holes is perfectly prevented by a pressed fit between a cover sheet 9 and a packing 12'. Although some liquid may be admitted therethrough, oil penetration into the interior of said sealing means will be perfectly stopped by means of a packing 12' extending above said free surface of liquid. With reference to FIG. 6c, a lower selvage 12 of said cover sheet 9 is turned over around a lower bolted part and bent upward.

Its upper edge 12' is extended above the free surface of liquid and provided with corrugations in a surface opposite to said side plate 3 of the floating cover thereby furnishing air gaps for stopping unusual rise of liquid through capillary reaction. If necessary, packing 12" of oil impervious soft rubber may be inserted into a folded portion of said cover sheet 9 to attain a more perfect tightness for liquid.

As described hereinabove, a sealing means according to the present invention comprises a core which is predominantly formed of soft compressible foam material of rubber, synthetic resin or soft material of similar property and a flexible cover sheet which is impervious to oil, liquid and gaseous substances and adapted to wrap up said core, the upper and lower edge portion of said cover sheet being adhered and fixed on the side plate of the floating cover by means of an oil impervious adhesive laying a retaining bar in gastight manner, and is pressed into a sealing part of the tank in flexed condition. Since said sealing means is shaped into a chevron-like cross section with its vertex portion made narrower than the base and provided with a smooth curvilinear surface, it will operate elastically similar to the lamellar leaf springs as a whole. Said sealing means will exert its increased tensile strength and bending strength by virtue of said cover sheet and slide along the inner wall of the tank with proper bending and compressive resistance thereby assuring a perfect gastight fit and a righting force against eccentricity of the floating cover.

As described hereinabove, it is one of the important features of the present invention to provide a core of foam material shaped substantially into a chevron of equilateral triangle having a free horizontal breadth wider than a horizontal spacing of the sealing part and adapted to flex when subjected to a bending and wrapped up with a cover sheet in such a manner as to increase the tensile strength and bending resistance of the foam material by taking advantage of the property of foam material and compensating its disadvantages by means of a cover sheet. That is, when a foam material constituting a cantilever is subject to a bending by an external force applied on its outer end, a bending moment will be exerted on it. This bending moment will be distributed such that its value is smaller at the free end than at the base of the chevron shaped core. Accordingly, a bending moment distribution diagram will become approximately triangular. In accordance with this natural principle, a foam material has been shaped into a chevron-like cross section with its vertex portion shaped narrower than the base which is in contact with side plates of the floating cover and the chevron may be made single or plural. The sealing means may be modified into various shapes as shown in each embodiment as far as afore-mentioned flexing is permitted.

For instance, in an embodiment as illustrated in FIG. 5a, upper and lower chevron elements are formed integral with the base portion 16 thereof. In case a cover sheet 9 is adhered on a core 4 leaving out the opposite surface of each chevron as illustrated in FIG. 7a instead of being adhered to the core 5 within the reentrant angle between both chevrons, both chevrons will be facilitated to flex inwardly, that is, the upper chevron will easily flex downwardly and the lower chevron upwardly as shown in FIG. 7b. And in case said cover sheet is adhered to the surfaces of the reentrant angle between each chevron, that is, all over the upper and lower surface of each chevron as illustrated in FIG. 5a, flexing of both chevrons may be equalized in upward and downward direction dependent upon the length of both sides of each chevron. FIG. 5b shows such flexing in an upward direction and FIG. 5c shows flexing in the opposite direction, similar to FIGS. 4b and 4c, respectively.

The sealing means in the embodiment of the invention illustrated by FIG. 7a can more particularly be described as having a substantially isosceles trapezoidal shape with the longer base at the radially inward face of the core member 4. The core member has a radially outwardly opening groove 18 of substantially U-shaped radial cross section. The triangularly shaped portions of the core 4' and 4" at the sides of the groove may bend into the groove in the manner shown in FIG. 7b when subjected to pressure against the wall 1 of the tank. The cover sheet 9 is securely bonded to the outermost axially facing surfaces of the core member with the longitudinally extending mid-portion of the sheet spanning the opening of the groove in substantially parallel relationship to the radially innermost face of the core member. The cover sheet and core member are both sealed to the periphery or side plate 3 of the floating roof at the upper and lower edge portions of the sheet and at said radial innermost face of the core member.

It will be understood that various changes in the details, materials and arrangements of parts which have been herein described and illustrated in order to explain the nature of the invention may be made by those skilled in the art within the principles and scope of the invention as expressed in the claims.

What is claimed is:

1. In combination, a floating roof for a liquid storage tank and a seal for said roof; said seal comprising a core member of resilient foamed synthetic resin or similar compressible material and a flexible oil-impervious cover sheet, said core member having an annular configuration and in its unstressed condition a radial cross-section of substantially isosceles trapezoidal shape with the longer base of such trapezoidal shape at the radially inward face of the core member, said core member having a radially outwardly opening groove of substantially U-shaped radial cross-section extending circumferentially along the outer face of said member, said groove extending radially inwardly from said outer face a distance at least half the radial dimension of the core member and being of sufficient size that both portions of the core member at the sides of the groove may bend into the groove, said cover sheet being securely bonded to the outermost axially facing surfaces of the core member with the longitudinally extending mid-portion of the sheet spanning the opening of the core member groove in substantially parallel relationship to the radially innermost face of the core member, said cover sheet and core member being sealingly secured to the periphery of said floating roof respectively at the upper and lower edge portions of the cover sheet and at the said radially innermost face of the core member.

2. In combination, a floating roof for a liquid storage tank and a seal for said roof; said seal comprising a core member of resilient foamed synthetic resin or similar compressible material and a flexible oil-impervious cover sheet, said core member having an annular configuration and in its unstressed condition a radial cross-section of substantially isosceles trapezoidal shape with the longer base of such trapezoidal shape at the radially inward face of the core member, said core member having a radially outwardly opening groove of substantially U-shaped radial cross-section extending circumferentially along the outer face of said member, said groove being of sufficient radial depth and area in radial cross-section so that both portions of the core member at the sides of the groove may bend into the groove without substantial shear stress or bodily compression of that portion of the core which lies radially inwardly of the bottom of the groove, said cover sheet being securely bonded to the outermost axially facing surfaces of the core member with the longitudinally extending mid-portion of said sheet spanning the opening of the core member groove in substantially parallel relationship to the radially innermost face of the core member, said cover sheet and core member being sealingly secured to the periphery of said floating roof respectively at the upper and lower edge portions of the cover sheet and at the said radially innermost face of the core member.

References Cited

UNITED STATES PATENTS

| | | | |
|---|---|---|---|
| 1,865,969 | 7/1932 | Schurmann | 220—26 |
| 2,085,752 | 7/1937 | Horton et al. | 220—26 |
| 3,002,828 | 10/1961 | Fino et al. | 220—26 X |
| 3,055,533 | 9/1962 | Reese et al. | 220—26 |
| 3,125,346 | 3/1964 | Poltorak | 220—26 X |

FOREIGN PATENTS

| | | |
|---|---|---|
| 487,774 | 6/1938 | Great Britain. |

THERON E. CONDON, *Primary Examiner.*

JAMES R. GARRETT, *Examiner.*